July 7, 1931.  C. M. O'LEARY ET AL  1,813,418
ORIFICE METER FITTING
Filed Dec. 24, 1928  2 Sheets-Sheet 1

Inventors
Charles M. O'Leary,
John F. Hiltscher.
James T. Batchelor
Attorney.

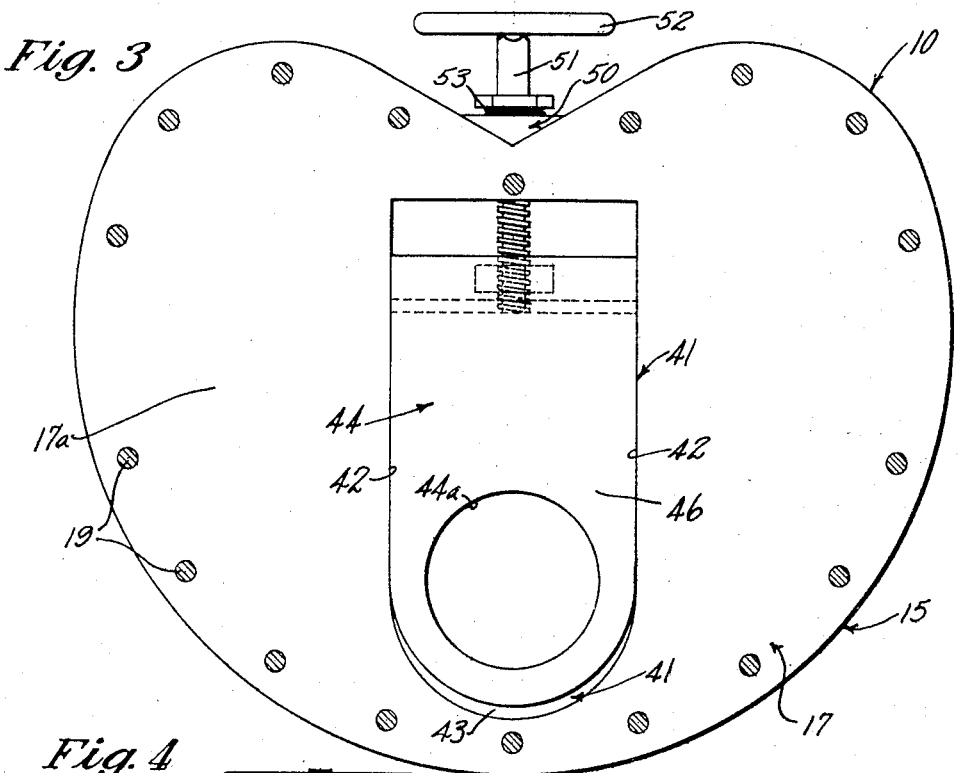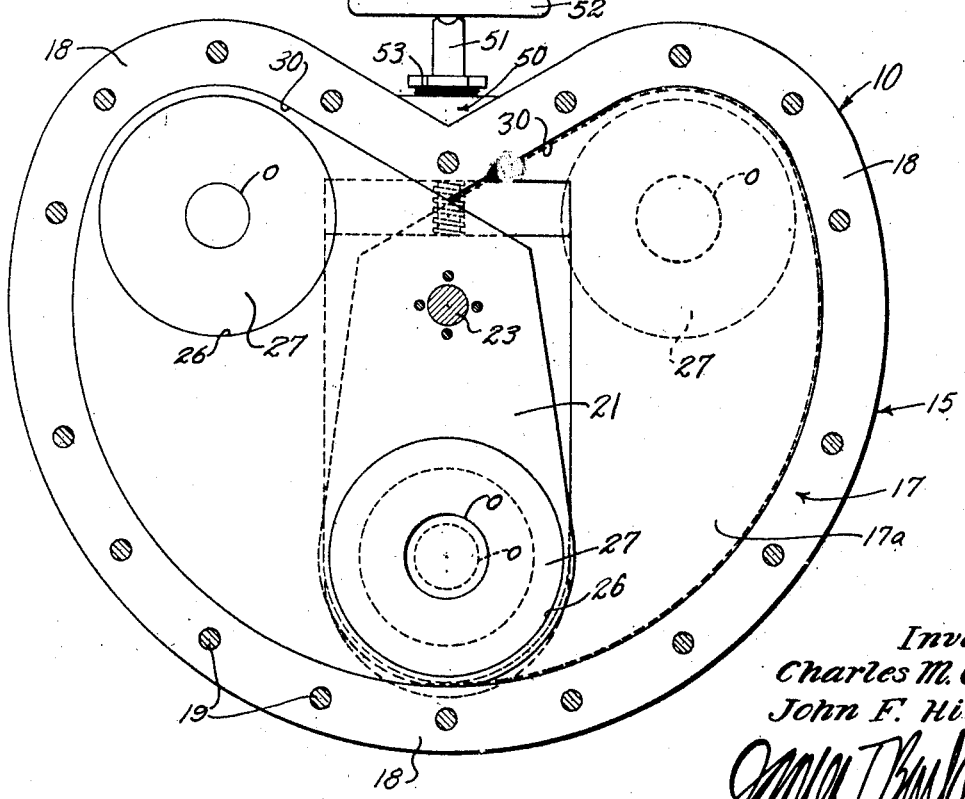

Patented July 7, 1931

1,813,418

UNITED STATES PATENT OFFICE

CHARLES M. O'LEARY AND JOHN F. HILTSCHER, OF LOS ANGELES, CALIFORNIA; LUCILLE U. HILTSCHER, ADMINISTRATRIX OF SAID JOHN F. HILTSCHER, DECEASED, ASSIGNOR TO SAID O'LEARY

ORIFICE METER FITTING

Application filed December 24, 1928. Serial No. 328,098.

This invention has to do with orifice meter fittings such as are utilized in measuring the flow of fluids through pipe lines; it being a general object of the invention to provide a fitting having simple and effective means for changing and renewing orifices, and for accomplishing this operation without shutting off flow through the fitting.

It is common practice to determine the rate of flow of gases or liquids through pipe lines by providing disks having standard orifices in the pipe line. A pressure reading is taken on each side of the orifice, and the rate of flow calculated from the differential of pressure, the orifice and pipe line diameters and known constants of the system. In order that an accurately readable differential of pressure be obtainable under all conditions, it has been found necessary to change the diameter of the orifice in accordance with variations in the rate of flow.

Orifice meter installations originally included an orifice disk bolted between flanges provided in the pipe line, and three gate valves and a by-pass line for use during the operation of changing orifice disks. Installations now commonly include a fitting having means for changing orifices without by-passing or shutting off flow, but these present fittings have certain deficiencies which it is an object of the present invention to overcome. The present invention relates to a fitting of this latter type embodying features of improvement as hereinafter pointed out.

A requirement for accuracy in measuring fluid flow through the use of orifices is that the orifice must be provided in a straight run of pipe approximately sixteen diameters of pipe, and without any fittings or variations in diameter (except at the orifice itself) on either side of the orifice. The fitting provided by the present invention meets this requirement, while providing means for quickly changing orifices without shutting off flow, this means comprising a movable orifice carrier plate provided in a housing and having a plurality of orifices, either of which may be thrown into the pipe line. One of the improvements of the present invention resides in the wedging means for tightly sealing an orifice plate in operative position in the pipe line.

The invention will best be understood from the following detailed description of a present preferred embodiment, reference for this purpose being had to the accompanying drawings, in which:

Fig. 3 is a cross section taken on line 3—3 of Fig. 2;

Fig. 4 is a cross section taken on line 4—4 of Fig. 2; and

Figure 2:
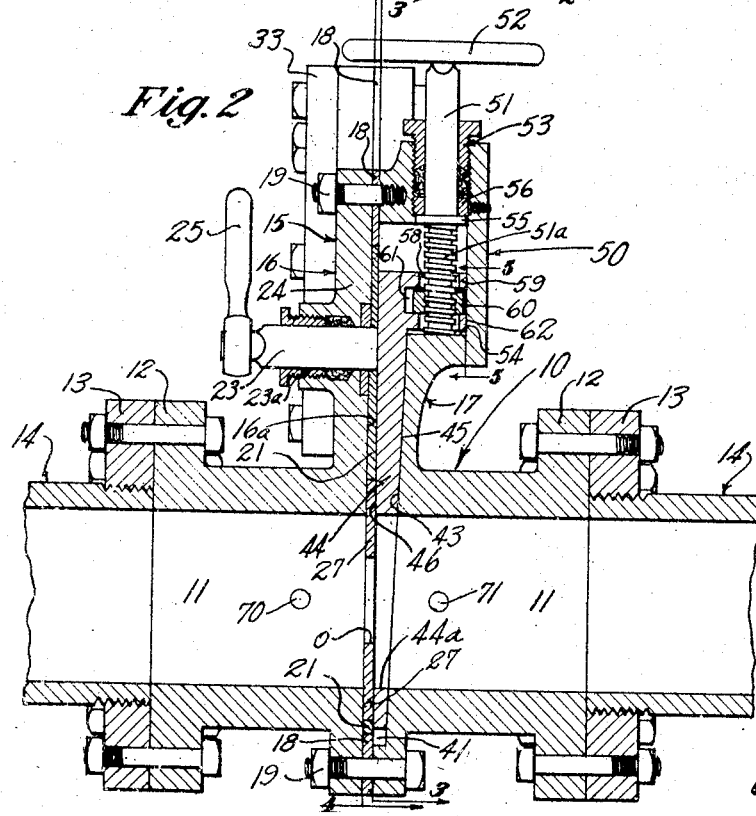
Fig. 2 is a vertical section taken on line 2—2 of Fig. 1.
Figure 5:
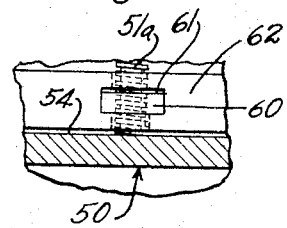
Fig. 5 is a section taken on line 5—5 of Fig. 2.

Referring now to the drawings, and particularly to Fig. 2, the numeral 10 indicates the body of the orifice meter fitting, the body having a conduit 11 and being flanged at 12 to be bolted to flanges 13 provided on the ends of the pipe line 14. The bore of conduit 11 is of the same diameter as that of the pipe line in which the fitting is made up. Body 10 also provides a transverse housing, generally indicated at 15, for members to be mentioned later, the body and housing, preferably, though not necessarily, consists of two halves 16 and 17, having adjacent plane faces 16a and 17a, spaced by a metal gasket 18, and securely bolted together about the outer edge of housing 15, as at 19.

Provided in housing 15 between the housing faces 16a and 17a is an orifice carrier plate 21, shown best in Figs. 2 and 4. Plate 21 is mounted upon the inner end of a shaft 23, which is carried in wall 24 of body half 16 and rotated by a handle 25 provided on its outer end. A stuffing box 23a is provided in wall 24 about shaft 23 to prevent leakage of the pipe line fluid during the operation of changing orifice disks as explained later. With particular reference to Fig. 4, plate 21 is provided with two openings 26 adapted to take orifice disks 27 having orifices O of standard, selected diameters. These orifice disks are of a diameter greater than the inside diameter of the body conduit, and are preferably of the same thickness as the orifice carrier plate. If a difference in thickness should exist, the disk would preferably be thicker. The looseness of fit of the plate and disk between the two surfaces 16a and 17a is in no case greater than the thickness of either plate or disk so as to keep the disk from falling out of the plate at any time. In some cases the orifices may be formed in the movable plate 21 itself, dispensing with the removable disks, although the removable disk arrangement is preferable. The plate 21 is adapted to be swung by means of handle 25 to either the full or dotted line positions of Figure 4, and is thus capable of bringing either of its carried orifice disks to the lower, operative position in axial alignment in the pipe line. Plate 21 is limited in motion in either direction by striking stops 30 provided by the upper inner edge 30 of gasket 18, one of the orifices O being in accurate axial alignment in the pipe line when plate 21 is in contact with this upper edge of the gasket on either side.

Figure 1:
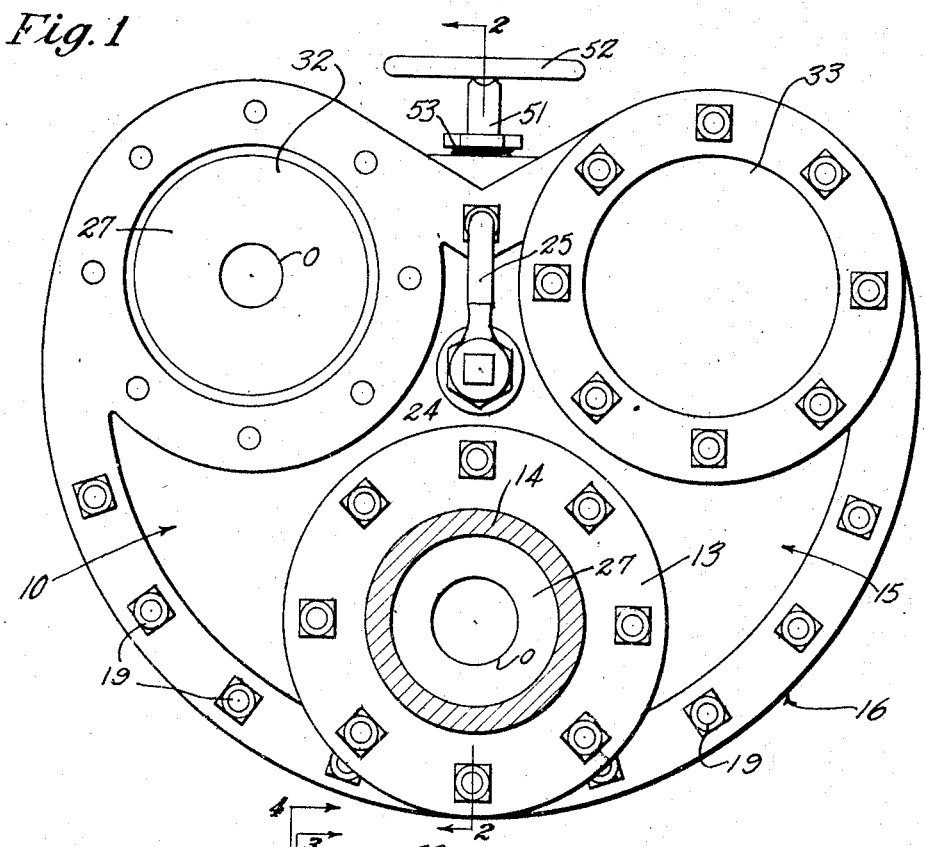
Figure 1 is an end elevation of the fitting, one of the housing plates being removed.

Access is gained to the interior of housing 15 for the purpose of changing the orifice disks carried by plate 21 by means of openings 32 provided in the housing wall 24, the openings being normally closed by cover plates 33 securely bolted to the housing. In Fig. 1 the left hand cover plate has been removed, showing the orifice disk 27 inoperatively carried by plate 21.

Face 17a of body half 17 has a recess 41, having vertical sides 42 and an inclined back wall 43. Mounted to slide and be guided vertically in recess 41 is a wedge plate 44 having an inclined rear face 45 adapted to work against the inclined back wall 43 of the recess, and having a vertical front face 46 adapted to contact the orifice disk carrying plate 21 and its orifice disk 27. When it is desired to clamp the plate 21 in position with an orifice in accurate alignment in the pipe line, the wedge plate 44 is forced downward, which action, due to the inclined surfaces 43 and 45, causes the vertical surface 46 of wedge plate 44 to be forced into tight contact with the plate 21 and its orifice disk 27. The wedge plate extends across the conduit, having a surface extending entirely around and overlapping the conduit and in tight contact with the orifice disk when the wedge plate is in clamping position, and having a bore or fluid passage 44a of the diameter of conduit 11 which comes into accurate alignment with the conduit when the wedge plate is forced tightly down. The wedge plate thus seals against leakage of pipe line fluid into the housing. When it is desired to change orifices, the wedge plate is raised until plate 21 can be moved.

The means for operating the wedge plate are enclosed in a housing 50 provided on body half 17. Mounted in housing 50 is a vertical shaft 51 operated by a hand wheel 52, and packed by a stuffing box 53. The lower end of shaft 51 bears on a horizontal bottom surface 54 of the housing interior, while an annular flange 55 provided on the shaft and bearing against a ring 56 screwed within the threaded bore through which the shaft extends prevents the shaft from upward displacement. The shaft is threaded at its lower end as at 51a, and passes loosely through a vertical bore 58 provided through a bracket 59 extending horizontally from the upper edge of the wedge plate. The shaft has operative connection with the wedge plate 44 by means of a square nut 60 screwed on shaft 53 and carried in a square recess 61 provided in the edge 62 of the wedge plate bracket 59. The nut fits the recess with sufficient snugness to prevent its turning on the shaft, but with sufficient looseness to allow the wedge plate a slight horizontal movement as it slides on the inclined surface 43. Thus turning hand wheel 52 in one direction screws the nut 60 upward, which in turn causes the wedge plate to be raised upwardly and out of tight contact with plate 21 and orifice disk 27; while turning the hand wheel in the other direction screws the nut downward, which carries the wedge plate downward and forward and forces it into tight contact against plate 21 and orifice disk 27.

Tapped drill holes 70 and 71 are provided in conduit 11 on opposite sides of the orifice for the attachment of pipes leading to the pressure meter, not shown.

Although the complete operation of the device will be apparent from the foregoing description, a brief recapitulation will here be given. In operation, the plate 21 holds one of its two carried orifice disks in accurate axial alignment in the pipe line, and is clamped in position by means of wedge plate 44, which is forced tightly down. To place the other orifice disk 27 in the pipe line, hand wheel 52 is rotated several turns to loosen the wedge plate, and plate 21 is then quickly shifted by means of handle 25 to its other limiting position, thereby carrying the other disk 27 into accurate alignment within the conduit. Hand wheel 52 is then turned back to force the wedge plate back down and into tight contact with plate 21 and orifice disk 27. The actual shifting of orifices by means of handle 25 is accomplished almost instantly, thus practically without interfering with the flow. With the wedge plate forced tightly down leakage into housing 15 is stopped, and the cover plate 33 over the inoperatively carried orifice disk 27 may be removed for the purpose of taking out disk 27 and replacing it with another.

It may now be seen that we have provided an orifice fitting in which no obstruction, except at the orifice itself, is offered to the free flow of fluid, in which the orifice disk in the pipe line may be quickly and simply changed, and in which the fitting may be opened up to change the size of the inoperatively carried orifice, or to renew a worn orifice, all without shutting off flow through the fitting and without leakage.

It will be understood the drawings and description are to be considered merely as illustrative of and not restrictive on the broader claims appended hereto, for various changes in design, structure and arrangement may be made without departing from the spirit and scope of said claims.

We claim:

1. In a device of the character described, a body having a fluid conduit, a housing having an interior chamber extending completely around the conduit and defined by two substantially parallel transverse wall surfaces, a carrier plate movable transversely in the chamber between the two parallel wall surfaces, the carrier having a disk receiving opening of a size greater than the cross sectional size of the conduit, and an orifice disk in the disk opening, the looseness of fit between the two parallel wall surfaces being less than the thickness dimension of either plate or disk.

2. In a device of the character described, a body having a fluid conduit, a housing having an interior chamber extending completely around the conduit and defined by two substantially parallel transverse wall surfaces, a carrier plate movable transversely in the chamber between the two parallel wall surfaces, the carrier having a disk receiving opening of a size greater than the cross sectional size of the conduit, an orifice disk in the disk opening, the looseness of fit between the two parallel wall surfaces being less than the thickness dimension of either plate or disk and wedge means for wedging the disk against one of the wall surfaces.

3. In a device of the character described, a body having a fluid conduit, a housing having an interior chamber extending completely around the conduit and defined by two substantially parallel transverse wall surfaces, a carrier plate movable transversely in the chamber between the two parallel wall surfaces, the carrier having a disk receiving opening of a size greater than the cross sectional size of the conduit, an orifice disk in the disk opening, the looseness of fit between the two parallel wall surfaces being less than the thickness dimension of either plate or disk, wedge plate operable to wedge the carrier against a wall movable transversely to the conduit and along one face of the disk, and means for operating the wedge plate including, a screw extending through the body, and a nut threaded on the screw and connected into the wedge plate, the wedge plate being free to shift laterally relative to the nut.

4. In a device of the character described, a body having a fluid conduit, a housing having an interior chamber extending completely around the conduit and defined by two substantially parallel transverse wall surfaces, a carrier plate movable transversely in the chamber between the two parallel wall surfaces, the carrier having a disk receiving opening of a size greater than the cross sectional size of the conduit, an orifice disk in the disk opening, the looseness of fit between the two parallel wall surfaces being less than the thickness dimension of either plate or disk and means for clamping the disk in the fluid conduit, said means comprising a wedge plate movable transversely to said conduit, a screw for actuating the plate, a nut on the screw loosely connected with the wedge plate, and an inclined surface on said body adapted to cooperate with the said wedge plate to clamp the said disk in the conduit by sole virtue of transverse movement of the said wedge plate to its clamping position.

5. In a device of the character described, a body having a fluid conduit, a housing having an interior chamber extending completely around the conduit and defined by two substantially parallel transverse wall surfaces, a carrier plate movable transversely in the chamber between the two parallel wall surfaces, the carrier having a disk receiving opening of a size greater than the cross sectional size of the conduit, an orifice disk in the disk opening, the looseness of fit between the two parallel wall surfaces being less than the thickness dimension of either plate or disk and means for clamping the disk in the fluid conduit, said means comprising a wedge plate movable adjacent said disk and transversely across the said conduit, said wedge plate having a fluid passage adapted to register with the conduit when the said wedge plate is in clamping position, and an inclined surface on said body adapted to cooperate with the said wedge plate to clamp the said disk in the conduit by sole virtue of transverse movement of the said wedge plate to its clamping position.

In witness that we claim the foregoing we have hereunto subscribed our names this 7th day of November, 1928.

JOHN F. HILTSCHER.
CHARLES M. O'LEARY.